(12) United States Patent
Varner et al.

(10) Patent No.: US 6,947,652 B2
(45) Date of Patent: Sep. 20, 2005

(54) DUAL-BAND BEND TOLERANT OPTICAL WAVEGUIDE

(75) Inventors: Wayne Francis Varner, Woodbury, MN (US); Craig Raymond Sykora, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 141 days.

(21) Appl. No.: 10/172,093

(22) Filed: Jun. 14, 2002

(65) Prior Publication Data
US 2003/0231847 A1 Dec. 18, 2003

(51) Int. Cl.[7] .............................................. G02B 6/22
(52) U.S. Cl. ...................... 385/127; 385/123; 385/124
(58) Field of Search ........................................ 385/127

(56) References Cited

U.S. PATENT DOCUMENTS

| | | | |
|---|---|---|---|
| 4,715,679 A | 12/1987 | Bhagavatula | |
| 4,838,643 A | 6/1989 | Hodges et al. | |
| 4,852,068 A | 7/1989 | Track | |
| 5,032,001 A | 7/1991 | Shang | |
| 5,278,931 A | 1/1994 | Antos et al. | |
| 5,555,340 A | 9/1996 | Onishi et al. | |
| 5,608,832 A | 3/1997 | Pfandl et al. | |
| 5,757,997 A | 5/1998 | Birrell et al. | |
| 5,852,690 A | * 12/1998 | Haggans et al. | 385/37 |
| RE36,146 E | 3/1999 | Novack et al. | |
| 5,902,435 A | 5/1999 | Meis et al. | |
| 6,005,999 A | 12/1999 | Singh et al. | |
| RE38,086 E | * 4/2003 | Onishi et al. | 385/123 |
| 6,577,800 B2 | * 6/2003 | Sarchi et al. | 385/123 |
| 6,711,330 B1 | 3/2004 | Donlagic | |

FOREIGN PATENT DOCUMENTS

| | | |
|---|---|---|
| EP | 0 447 075 A2 | 9/1991 |
| EP | 0554714 A1 | 1/1993 |
| EP | 0689068 B1 | 6/1995 |
| EP | 1094346 A1 | 10/1999 |

OTHER PUBLICATIONS

Ainslie, et al, "Low Loss Dual Window Single Mode Fibres With Very Low Bending Sensitivity", IOOC–ECOC '85, Technical Digest, pp. 317–320.

Dong, et al, "Optical Fibers with Depressed Claddings for Suppression of Coupling into Cladding Modes in Fiber Bragg Gratings", IEEE Photonics Technology Letters, vol. 9, No. 1, Jan. 1997, pp. 64–66.

Scheerer, "Phase Distortions in Optical Transmission Systems", Frequenz, vol. 54, No. 1–2, Jan.–Feb. 2000, pp. 42–46.

Scheerer, et al, "Influence of Filter Group Delay Ripples on System Performance", ECOC'99, Sep. 26–30, 1999, pp. I–410–I–411.

Ennser, et al, "Influence of Nonideal Chirped Fiber Grating Characteristics on Dispersion Cancellation", IEEE Photonics Technology Letters, vol. 10, No. 10, Oct. 1998, pp. 1476–1478.

(Continued)

Primary Examiner—John R. Lee
Assistant Examiner—Phillip Johnston
(74) Attorney, Agent, or Firm—Gregg H. Rosenblatt

(57) ABSTRACT

An optical waveguide, such as an optical fiber, including a core having a refractive index $n_{co}$ and a radius $r_{co}$; an inner cladding laterally surrounding the core, the inner cladding having a refractive index $n_{ic}$ and an outer radius of $r_{ic}$; an outer cladding laterally surrounding the inner cladding, the outer cladding having a refractive index $n_{oc}$; and a narrow depressed well, wherein $n_{co} > n_{oc} > n_{ic}$. The range of the ratio of the inner, depressed-well clad radius, $r_{ic}$, to core radius, $r_{co}$, varies from about 2.4 to 3.0. The waveguide has a $+\Delta$ of about 0.0014 to 0.0021, a $-\Delta$ of about $-0.0021$ to $-0.0034$, and a $\Delta_{Tot}$ of about 0.0043 to 0.0049.

17 Claims, 4 Drawing Sheets

Refractive Index Profile of Preform

Preform diameter - mm

OTHER PUBLICATIONS

Agrawal, *Fiber–Optic Communications Systems,* A Wiley Interscience Publication,Chap. 9.5–9.6.1, pp. 438–445.

Corning® SMF–28™ fiber product sheet.

Hagemann, et al, *"The Performance of Depressed–Cladding Single–Mode Fibers with Different b/a Ratios"*, Journal of Lightwave Technology, vol. 9, No. 6, Jun. 1991, pp. 689–694.

Nufern PF1 Pigtail Fiber Product Sheet.

Allard, P.G. & Yip, G.L.; "Bending–Loss Studies of a Single–Mode Triangular–Index fiber with a Depressed Cladding Ring with a Vector–Mode Method," *Applied Optics* (Nov. 20, 1994); vol. 33, No. 33; pp. 7725–7732.

Hagemann, Hans–Jürgen, et al; "The Performance of Depressed–Cladding Single–Mode Fibers with Different b/a Ratios," *Journal of Lightwave Technology* (Jun. 1991); vol. 9, No. 6; pp. 689–694.

Lazay, P.D. & Pearson, A.D.; "Developments in Single–Mode Fiber Design, Materials, and Performance at Bell Laboratories," *IEEE Journal of Quantum Electronics* (Apr. 1982); vol. QE–18, No. 4; pp. 504–510.

* cited by examiner

DUAL-BAND BEND TOLERANT OPTICAL WAVEGUIDE

FIELD OF THE INVENTION

The present invention relates to a depressed well optical waveguide operating in the 1300–1620 nm window. In particular, the present invention relates to a single mode fiber dual wavelength band design that is able to operate in tight bend environments with minimal bend induced losses while having a mode field diameter (MFD) that matches large mode-field diameter fibers such as common long haul telecommunications fibers.

BACKGROUND OF THE INVENTION

Optical fibers form some of the main lines through which telecommunications data is connected all over the world. An optical fiber typically includes a core region surrounded concentrically by a cladding. Some fiber designs, known as "double cladding" designs, surround the core region with an inner cladding, which is in turn surrounded by an outer cladding. The outer cladding likewise is surrounded by an external medium.

The parameters in such double cladding waveguide designs usually are:

| | Dependent parameters |
|---|---|
| MFD | operational mode field diameter |
| $\lambda$ | operational wavelength |
| $\lambda_c$ | second mode cutoff wavelength |
| | Independent parameters |
| $r_{co}$ | core radius generated from a single effective (refractive index) step approximation of the core region |
| $r_{ic}$ | inner cladding radius |
| W | inner cladding width ($r_{ic} - r_{co}$) generated from a single effective step approximation of the inner cladding region |
| $r_{oc}$ | outer cladding radius |
| $n_{co}$ | core refractive index generated from a single effective step approximation of the core region |
| $n_{ic}$ | inner cladding refractive index generated from a single step approximation of the inner cladding region |
| $n_{oc}$ | outer cladding refractive index |
| $n_{ext}$ | external medium refractive index |
| $+\Delta$ | $= (n_{co} - n_{oc})/n_{oc}$ |
| $-\Delta$ | $= (n_{ic} - n_{oc})/n_{oc}$ |
| $\Delta_{Tot}$ | $= |(+\Delta)| + |(-\Delta)|$ |

As a light signal travels in an optical fiber the signal is attenuated, due to both material effects and waveguide effects. Waveguide effects include two categories of optical bending loss, microbending and macrobending losses.

In the early days of the fiber optic telecommunications industry, the first large-scale commercial systems were designed to operate at an operational wavelength $\lambda$ of about 1300 nm, because that is a region of relatively low optical absorption loss and very low chromatic dispersion for silica fibers. Technology was developed for making optical detectors and semiconductor laser optical sources that would operate in that 1300 nm wavelength range. Thousands of miles of buried and undersea cables containing optical fibers designed for operation at 1300 nm were installed.

However, it was known that the intrinsic optical absorption losses in silica fibers were even lower at 1550 nm. This lower loss would be a great benefit in long haul telecommunications lines, because it would reduce the number of remotely powered buried or undersea repeater stations required to amplify and boost the signal along the optical path. Eventually, optical sources and detectors were developed which would operate at 1550 nm, and fiber systems based on this operational wavelength began to be installed.

Typically, one of the largest costs in establishing a fiber optic system is burying or installing the cable. In anticipation of the coming switch to 1550 nm systems, fiber suppliers began making telecommunications optical fibers that could operate at either 1300 nm or 1550 nm, such as Corning SMF-28™ single mode fiber. This fiber has a typical core diameter of 8.2 micrometers and a MFD of about 9–10 microns in the dual-band window from 1300 nm to 1550 nm. This fiber is known as a "matched clad" design with an effective step index core having a (normalized or relative) core refractive index above the outer cladding ($+\Delta=(n_{co}-n_{oc})/n_{oc}$) of about 0.0035.

The first fiber optic telecommunication systems were limited to "long haul" applications from one telephone company central office to another. The recent trend had been to extend fiber optics outward from the central offices, providing "fiber to the campus" and "fiber to the desktop" in commercial buildings, and "fiber to the neighborhood" and eventually "fiber to the home" in residential areas. One example of the implementation of this trend is the Volition™ VF-45 fiber optic connector and premise "wiring" system, manufactured by 3M Company, of St. Paul, Minn., as shown in several patents, including U.S. Pat. No. 5,757,997. The connector design for this system relies on the spring force of a bent bare optical fiber end to provide engagement force and positive alignment between two optical fibers.

To minimize optical losses in connectors such as these, it is important that both fibers are designed to operate at the same wavelength and to have approximately the same mode field diameter (MFD) at that wavelength. For such connectors, it is not practical to adjust the MFD of the two fiber ends by high temperature diffusion of core dopants, as can be done when fusion splicing two optical fibers for long haul cables (see, e.g., EP 1094346 A1).

Long haul telecommunications fibers are typically kept relatively straight in large multi-fiber cables, and are thus protected from macrobending losses of light due to exceeding the critical bend radius of the fiber design (typically in the range of 25 mm to 12.5 mm). For fiber optic systems installed within commercial or residential buildings, which may include small single or duplex fiber optic cables, it would be highly desirable for the fiber to tolerate (both optically and mechanically) smaller radius bends, both for routing within walls and for jumper cables which may connect a fiber optic wall outlet to a computer or other piece of equipment. Also, the induced bend in optical fiber ends used in the Volition™ VF-45 fiber optic connector can be a source of optical loss when standard single mode telecommunications fibers are used.

As discussed above, two categories of optical bending loss are microbending and macrobending losses. Macrobending loss occurs when a length of fiber is bent into a curve such that some light is radiated out of the core into the cladding of the fiber and lost. Microbending losses result from concentrated pressure or stresses exerted on the surface of the fiber. Microbending loss occurs when the fiber is exposed to localized pressures and stress points as, for example, if the fiber is pressed against a rough textured surface (such as sandpaper). When the outer surface of the fiber is pressed against the raised points, a coating that is too hard may transfer these stresses to the core, causing scattering losses. Microbend losses are usually negligible for short lengths of fiber.

Such stresses may be reduced by providing a relatively soft, low-modulus inner coating on the surface of the glass fiber. However, usually such coatings are removed from the fiber end in order to accurately align a single mode fiber with another fiber in a connector. The stripped fiber ends are then susceptible to breakage from abrasion and moisture.

One solution to this problem is a fiber having a glass core, glass cladding, polymer cladding (GGP fiber) construction, as described in U.S. Pat. No. RE 36146, which is hereby incorporated by reference. In the present application, "GGP" coatings are defined as any of the coating materials claimed in commonly-owned U.S. Pat. Nos. 5,381,504 or RE 36,146; and U.S. patent application Ser. No. 09/973,635 ("Small Diameter, High Strength Optical Fiber"); U.S. patent application Ser. No. 09/721,397, "Optical Fiber With Improved Strength In High Humidity/High Temperature Environments"; U.S. provisional application No. 60/167,359, filed Nov. 23, 1999; and in Toray Industries, Inc., U.S. Pat. No. 5,644,670; or Showa Electric Wire & Cable Co., Ltd., U.S. Pat. No. 6,269,210 B1 (all of which are hereby incorporated by reference).

These coating materials typically have a Shore D hardness of about 55 or more, or a Young's Modulus of from 50 kg/mm$^2$ to 250 kg/mm$^2$ at room temperature, and they adhere tightly to the outermost glass surface of the optical fiber. They are exemplarily applied to an optical fiber such that their outer surface is sufficiently concentric with the core of the optical fiber that when a GGP coated fiber is placed in a typical fiber optic mechanical connector and optically connected to a second fiber, the optical loss is not significantly greater than for a similar connection using an uncoated fiber having the same outer diameter as the GGP-coated optical fiber. "GGP3" coatings are defined to include the GGP 3.1 and GGP 3.2 coating formulations disclosed in commonly-owned U.S. patent application Ser. No. 09/721,397, "Optical Fiber With Improved Strength In High Humidity/High Temperature Environments", based on U.S. provisional application No. 60/167,359, filed Nov. 23, 1999. These materials are generally GGP coatings according to the definition above that are UV-curable compositions cured with a photoinitiator such as an iodonium methide salt that does not hydrolyze to release HF or Fluoride ion. GGP 3.2M coatings are defined as GGP3 coatings according to formulation GGP 3.2 as disclosed in U.S. patent application Ser. No. 09/721,397, further including an iodonium methide photoinitiator.

In a GGP fiber, the glass portion of the optical fiber is smaller than the standard 125 micrometer outside diameter, and an adherent, very concentric, and relatively hard polymer layer is added to bring the fiber diameter up to the standard 125 micrometer diameter while maintaining concentricity for connectorization. The construction is cabled within a low-modulus coating to minimize microbending losses, but when the low modulus coating is stripped off for connectorization the outer glass surface of the fiber is not exposed or damaged.

GGP coatings also provide protection for the glass surface from scratches and the moisture induced reduction in mechanical strength. A current fiber used in a "Volition™" single mode product is designed to interconnect with Corning's SMF-28 product, i.e., it has the same 2nd mode cutoff characteristic (<1260 nm), the same mode field diameters (9.2 microns @ 1300 nm and 10.4 microns at 1550 nm) and similar attenuation (<0.55 dB/km). The primary difference is that this "Volition™" fiber has a 100 micron glass diameter and three coatings including a "permanent" primary coating that results in a stripped fiber diameter of 125 microns, for fitting into standard connector ferrules and mating to standard fibers. The SMF-28 fiber has two strippable coatings over a 125 micron glass diameter. Once these non-permanent coatings on the SMF-28 fiber are removed, the outer glass fiber surface is vulnerable to the degrading effects of water and mechanical abrasion while the "Volition™" fiber remains protected by its "permanent" primary coating. However, SMF-28 fiber was designed for ultra low attenuation to minimize the need for repeaters/amplifiers in long haul telecommunications networks. A limitation imposed by matching to SMF-28 is the resulting poor bend performance inherent in the high MFD for the matched clad SMF-28 design.

Even for shorter applications where low attenuation is not a fundamental driver, the SMF 28 design places an undesirable lower limit on the bend tolerance of the fiber at the longer wavelengths—about a 1" minimum diameter. Although a matched clad index fiber that is mode-matched to SMF-28 may provide reasonably low losses in a tight bend application such as presented by the VF45 connector, it is limited to a single wavelength—either 1300 or 1550 nm—and must have a very carefully controlled 2nd mode cutoff wavelength to provide the necessary tight modal confinement. SMF-28 and the discussed Volition™ fiber provide adequate bend tolerance at 1300 nm, but not at 1550 nm.

While a separate matched clad fiber design that is mode matched to SMF-28 solely at the 1550 nm band having a satisfactory bend loss is possible, it is less desirable from a manufacturing perspective and provides less flexibility for future changes/upgrading.

Among the optical fiber applications with the most severe bending loss requirements have been the fiber optic guided missile (FOG-M) and tethered weapons applications for the military. Here, the optical fiber that carries the target imaging data back to the operator, and also carries guidance signals to the missile, is stored on a small spool or bobbin. In addition to the bends in the many turns of fiber stored on the spool, when the missile is launched there is an extreme bend at the payoff point where the fiber attached to the missile is leaving the spool. Designs for fibers used in tethered weapon applications have concentrated on keeping the light signals very tightly confined in the fiber core, by designing fibers with small MFD (~4–7 micrometers at 1550 nm). Some designs include a depressed refractive index well around the core (so called "W" fibers) that provide for a broader range of operating wavelengths. The high matched clad index design may also provide reasonable bend tolerance if designed to operate at a single wavelength. Examples of depressed well, small MFD fibers are described in U.S. Pat. Nos. 4,838,643, and 5,032,001.

Although these fibers meet the requirements for low bend loss, their small MFDs make them unsuitable for connectorization to the low cost, large (>8.0 microns) MFD telecom fibers. Dual wavelength versions of these fibers have the smallest MFDs and therefore the largest MFD mismatches and associated connector losses making them unsuitable for the intended application of the inventive fiber. These fibers can only be fusion spliced or thermally treated to eliminate the MFD mismatch, which is not an option in the multiple plug-in/disconnect applications.

In general, fiber designs with smaller MFDs have higher NAs at a given wavelength, since both indicate a more tightly confined optical mode, which will be less affected by macrobending or other external influences. The relationship between MFD, macrobending loss, and second mode cutoff wavelength is discussed in U.S. Pat. Nos. 5,608,832 and 5,278,931, and references therein.

Thus, there is a need for optical fibers for premise wiring and patch cables used for connecting equipment to the premise wiring that can operate at either 1300 nm or 1550 nm, have mode field diameters approximately matching that of telecommunications fibers such as Corning SMF-28™ single mode fiber, and can mechanically and optically tolerate prolonged bends with a bend radius less than half an inch (or 12 mm). Patch cord fibers would preferably work at either 1300 nm or 1550 nm. The local communications systems to which they will be connected, particularly if these are based on fibers such as Corning SMF-28™, could be operating at either (or even both) wavelengths. Also, 1300 nm Corning SMF-28™ systems may be upgraded to 1550 nm systems without installing new optical fiber cables, and it is undesirable to buy all new patch cords as part of the upgrade.

SUMMARY OF THE INVENTION

Fibers in accordance with the present invention provide tight bend tolerance in high MFD (>9 micrometers at 1550 nm) designs, which allows them to be either fusion spliced or mechanically connected to other high MFD fibers with minimal splice losses.

An optical waveguide in accordance with the present invention includes a core having a refractive index $n_{co}$ and a radius $r_{co}$; an inner cladding laterally surrounding the core, the inner cladding having a refractive index $n_{ic}$ and an outer radius of $r_{ic}$; an outer cladding laterally surrounding the inner cladding, the outer cladding having a refractive index $n_{oc}$; and a narrow depressed well, wherein $n_{co} > n_{oc} > n_{ic}$. The range of the ratio of the inner, depressed-well clad radius, $r_{ic}$, to core radius, $r_{co}$, varies from about 2.4 to 3.0. The waveguide has a +Δ of about 0.0014 to 0.0021, a −Δ of about −0.0021 to −0.0034, and a $\Delta_{Tot}$ of about 0.0043 to 0.0049.

In one exemplary embodiment, the optical waveguide has a depressed-well clad to core diameter ratio is about 2.7, a +Δ of about 0.0019, a −Δ of about −0.0028, and a $\Delta_{Tot}$ of about 0.0047. An exemplary core diameter for a waveguide in accordance with the present invention is about 10–12 micrometers. An exemplary operating wavelength range is between about 1300 to 1550 nm and a second mode cutoff wavelength of less than 1300 nm. An exemplary MFD is between about 8.8 to 9.6 microns when measured at 1300 nm. and/or between about 9.6 to 11.2 microns when measured at 1550 nm.

Values for bend losses for an exemplary fiber according to the present invention are less than or equal to 0.05 dB when measured on a 0.635 cm 90 degree bend at 1300 nm and bend losses less than or equal to 0.2 dB when measured on a 0.635 cm-90 degree bend at 1550 nm. Another exemplary embodiment exhibits bend losses less than or equal to 0.2 dB when measured on a 0.635 cm 90 degree bend at 1550 nm. Yet another exemplary embodiment has bend losses less than or equal to 0.3 dB when measured on a 0.635 cm 90 degree bend at 1620 nm.

In particular exemplary embodiments, the optical waveguide has a glass core and claddings, and further includes a hard polymer permanently bonded to the outside surface of the glass waveguide. Alternative compositions for such hard polymer include GGP, GGP3, and GGP 3.2M. The waveguide may further include a soft polymer material coating the hard polymer, wherein the soft polymer materials may comprises coatings selected from the group of Desolite 3471-3-14, Desolite 3471-1-152A, and Shin-Etsu OF-206.

The inner cladding of exemplary embodiments may include fluorosilicate, borosilicate, phosphorus fluorosilicate, phosphorus borosilicate, germanium fluorosilicate or germanium borosilicate compositions.

The optical waveguide may be an optical fiber, such as a single-mode dual-band optical fiber. Optical devices including waveguides in accordance with the present invention are also contemplated.

DETAILED DESCRIPTION OF THE INVENTION

As discussed above, the low attenuation design of the SMF-28 fiber results in high bend losses in tight bend applications. The present invention is directed to an optical waveguide, such as an optical fiber, that is mode matched to SMF-28 at both the 1300 and 1550 nm bands and has a satisfactory bend loss at both 1300 and 1550 nm.

Figure 1:
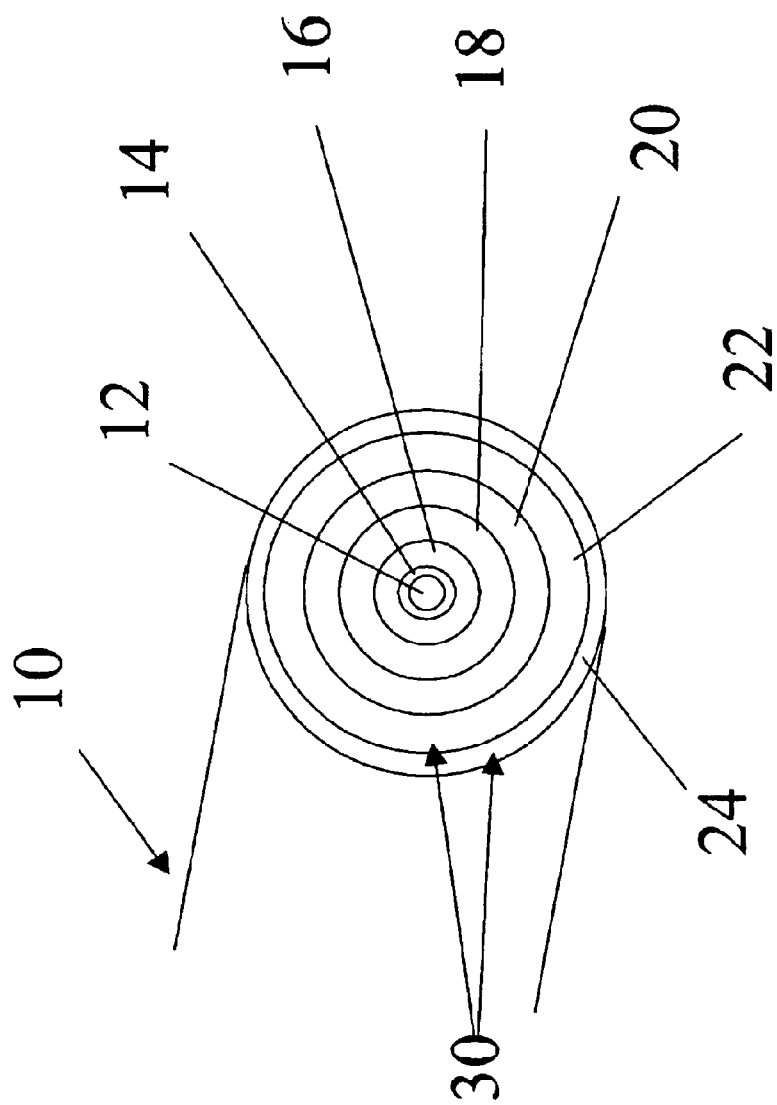
FIG. 1 is an isometric view of a cross-sectional cut of a waveguide in accordance with the present invention.

FIG. 1 shows an optical fiber 10 constructed in accordance with the present invention. Optical fiber 10 includes a protective coating 20 and a buffer 30. Optical fiber 10 further includes a core 12, inner cladding 14, and an outer cladding 16. The core 12, the inner cladding 14, and the outer cladding 16 are exemplarily constructed of glass, but may also be constructed of any suitable material. The claddings 14 and 16 also may be constructed from materials other than glass, such as fluoropolymers, fluoroelastomers, and silicones. One additional glass layer 18 concentrically surrounds the glass core and claddings. The layer 18 is the original support material collapsed from the initial preform tube, generally comprising silica glass.

Protective coating 20 is a GGP coating described below and surrounds the layer 18.

The buffer 30 longitudinally encloses optical fiber 10 includes in the particular embodiment illustrated an inner, resilient layer 22 and an outer, rigid layer 24. Inner, resilient layer 22 provides optical fiber 10 with protection against microbending losses while outer, rigid layer 24 protects the underlying layers from abrasion and mechanical damage.

Figure 2:
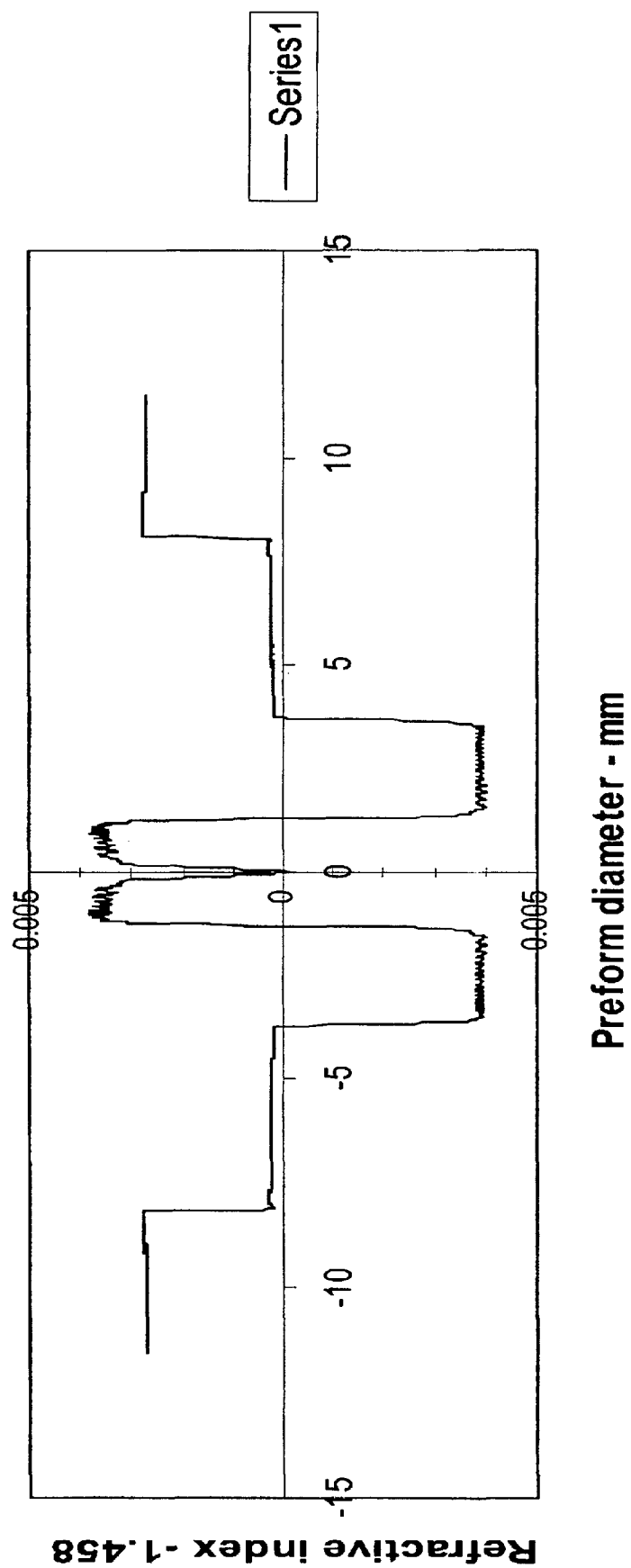
FIG. 2 is a graph depicting an actual refractive index profile along the diameter of a second embodiment of an optical fiber preform in accordance with the present invention.
Figure 3:
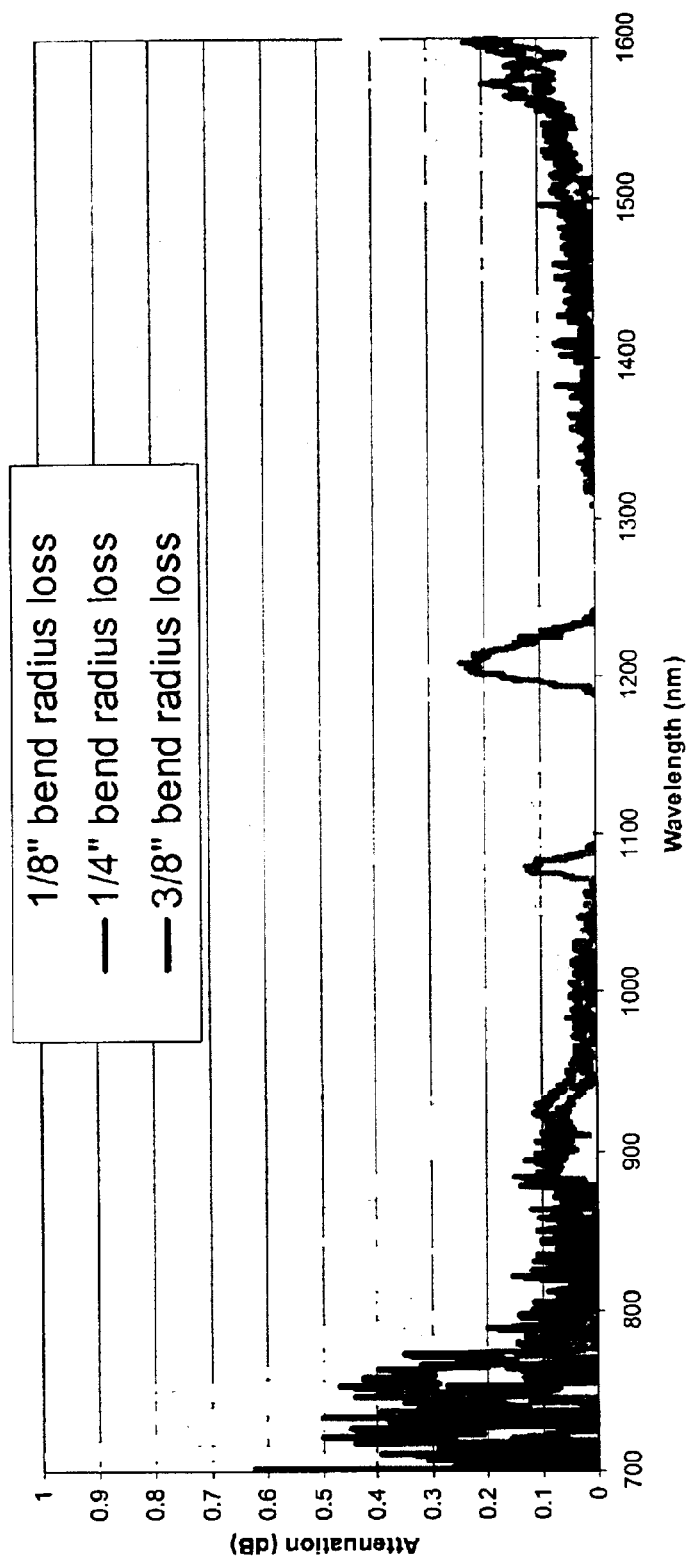
FIG. 3 is a graph of attenuation vs. wavelength as a function of bend radius for the fiber having the profile illustrated in FIG. 2.

FIG. 2 graphically illustrates the refractive index profile along the diameter of an embodiment of an optical fiber 10 in accordance with the present invention. FIG. 3 is a graph of attenuation vs. wavelength as a function of bend radius for the same fiber. The optical fiber 10 is a single-mode uncoated optical fiber having a cylindrical cross-section. It is to be understood that other embodiments of the present invention may include multi-mode fibers, fibers with coatings, and fibers having different cross-sectional geometries known in the art.

The optical fiber 10 includes the core 12 having a first transverse dimension or diameter $2r_{co}$ and being comprised of a material having a refractive index $n_{co}$. Laterally surrounding the core 12 is an inner cladding 14 having and a width W, $(r_{ic}-r_{co})$, an inner cladding or barrier radius $r_{ic}$ and a refractive index $n_{ic}$. The outer cladding 16, having a refractive index $n_{oc}$, laterally surrounds the inner cladding 14.

The refractive index of the air or other external medium or cladding surrounding the optical fiber is denoted as $n_{ext}$.

Unlike a typical matched cladding fiber, the optical fiber 10 has a depressed inner cladding configuration. As can be appreciated from FIG. 2, for fiber 10 the refractive index of the core $n_{co}$ has a greater absolute value than the refractive index of the outer cladding $n_{oc}$. In turn, the refractive index of the outer cladding has a greater absolute value than the refractive index of the inner cladding $n_{ic}$. Accordingly, $$n_{co} > n_{oc} > n_{ic}$$

The difference between $n_{co}$ and $n_{ic}$ and $n_{oc}$ and $n_{ic}$ creates a refractive index profile depressed well of width W and of depth $\Delta n-$, where $\Delta n- = n_{oc}-n_{ic}$. The difference between $n_{co}$ and $n_{oc}$ is defined as $\Delta n+$, where $\Delta n+ = n_{co}-n_{oc}$. The total height of the core refractive index profile, $\Delta n$, equals $n_{co}-n_{ic}=\Delta n-+\Delta n+$. The equations for the normalized index delta are:

$$+\Delta = (n_{co}-n_{oc})/n_{oc};$$

$$-\Delta = (n_{ic}-n_{oc})/n_{oc}; \text{ and}$$

$$\Delta_{Tot} = |(+\Delta)| + |(-\Delta)|,$$

where $n_{co}$ is the effective step index of the core;

$n_{ic}$ is the refractive index of the inner cladding (the depressed well or moat); and $n_{oc}$ is the refractive index of the outer cladding.

EXPERIMENTAL DATA

Example 1

One exemplary embodiment of an optical fiber in accordance with the present invention has the following material composition:
Core Low-lightly doped germanium silicate glass (2.5 mole % of $GeO_2$)
Inner cladding Phosphorus fluorosilicate (~0.1 mole % $P_2O_5$ and 3.4 mole % F)
Outer cladding Fused Silica (100 mole %)

A preform having the material composition described above was manufactured using the modified chemical deposition (MCVD) process using a 19×25 mm fused silica tube by first depositing 18 cladding layers with flows of 700, 100 and 110 standard cc/min of $SiCl_4$, $POCl_3$, and $SiF_4$, respectively. This was followed by 10 core layers consisting of 164 and 92 standard cc/min of $SiCl_4$ and $GeCl_4$, respectively, followed by two collapse passes and one seal pass resulting in a preform diameter of 16.2 mm. Two overcollapses using 22×25 and 24×30 mm fused silica tubes were required to obtain a final preform diameter of 25.4 mm. This preform was then milled to a final diameter of 24.9 mm. The refractive index profile of this preform prior to overcollapse and milling is shown in FIG. 2. The preform was overcollapsed prior to drawing, and was drawn as an optical fiber.

In the present example, a hard, permanent polymer coating is placed on the outer surface of the glass portion to a diameter of 125.0 microns. A second, softer coating is applied over the UV curable primary coating to a diameter of approximately 180 microns. Typical materials used for this softer coating layer may include Desolite 3471-3-152A or Desolite 3471-3-14, available from DSM Desotech, Inc., 1122 St. Charles St., Elgin, Ill., 60120, or Shin-Etsu OF-206, available from Shin-Etsu Chemical Co., Ltd., 6-1, Otemachi 2-chome, Chiyoda-ku, Tokyo 100-0004, Japan. A third, harder coating is applied over the secondary coating to provide a durable outer coating. Typical materials for use as this harder coating may include Desolite 3471-2-136, Desolite 3471-3-14, also available from DSM Desotech, Inc. (Desolite 3471-3-14 is described as an intermediate hardness material which can be used for single-coat applications.) Commonly-assigned U.S. Patent RE 36,146 and U.S. patent application Ser. Nos. 09/721,397 and 09/973,635, all of which are hereby incorporated by reference, discuss various possible coating compositions. The softer second coating helps reduce microbending losses by cushioning micro-stress points rather than transmitting micro-stresses to the light-carrying core.

The outer two coatings are easily stripped from the permanently bonded primary coating resulting in a protected fiber end having a coated diameter of 125.0 microns. This diameter is controlled in such a way that the stripped fiber end will fit in standard 125 micron connector ferrules.

The fiber had the following characteristics:
a.) clad/core diameter ratio is 2.6
b.) +Δ of 0.0019
c.) −Δ of −0.0028
d.) $\Delta_{Tot}$ of 0.0047

The procedure to measure bend loss followed the guidelines set forth in the EIA/TIA-455-62-A (FOTP 62) industry standard test method. Basically, the bend loss of the fiber was measured by wrapping the fiber around a mandrel having the specified radius, a predetermined number of turns and then measuring the difference in transmission between the same fiber in a straight configuration and the bent configuration.

This design resulted in fiber with the following properties:
Cutoff wavelength=1220 nm
MFD @ 1300 nm=8.9 microns
MFD @ 1550 nm=9.8 microns
Bend loss (0.635 cm 90°)<0.05 dB @ 1300 nm
Bend loss (0.635 cm 90°)=0.13 dB @ 1550 nm
Bend loss (0.635 cm−90°)=0.21 dB @ 1600 nm.

Example 2

A second sample of optical fiber having a similar design in accordance with the present invention was drawn and measured.

a.) clad/core diameter ratio is 2.4
b.) +Δ of 0.0014
c.) −Δ of −0.0028
d.) $\Delta_{Tot}$ of 0.0042

This design resulted in fiber with the following properties:
Cutoff wavelength=1225 nm
MFD @ 1300 nm=9.4 microns
MFD @ 1550 nm=10.4 microns
Bend loss (0.635 cm 90°)=<0.05 dB @ 1300 nm
Bend loss (0.635 cm 90°)=0.20 dB @ 1550 nm
Bend loss (0.635 cm 90°)=0.25 dB @ 1600 nm Index delta values were taken from measurements done on the fiber preforms before fiber drawing. The measurements were done with a He—Ne laser at 633 nm. The refractive index of the outer cladding in these fibers is essentially the same as pure silica, which for calculation purposes was taken to be 1.458 at 633 nm.

Example 3

The bend performance of an optical fiber in accordance with the present invention was compared with two simple, single wavelength matched clad, matched mode-field diameter designs.

| Fiber | Bend performance at 0.95 cm. (3/8") 90° bend at 1300 nm | Bend performance at 0.95 cm. (3/8") 90° bend at 1550 nm | Bend performance at 0.635 cm. (1/4") 90° bend at 1550 nm |
|---|---|---|---|
| "Volition" type | <0.05 dB | 0.7 dB | 3 dB |
| TF 45 fiber | N/A | <0.05 dB | 0.06 dB (cutoff 1500 nm) 0.50 dB (cutoff 1400 nm) |

As may be seen in the above table, a Volition™-type single mode fiber, available from 3M Company, St. Paul, Minn., was found to give adequate performance at a 0.95 cm (3/8") radius 90 degree bend (henceforth referred to as a 0.95 cm (3/8") 90 bend) when operating at 1300 nm, however, the bend loss increased to 0.7 dB at 1550 nm. At the 0.635 cm (1/4") 90 bend conditions, 1550 nm bend loss increased to 3 dB, which is equivalent to losing half the light intensity.

Test fiber 45 (called TF 45 fiber) is a mode matched, matched clad fiber in accordance with the present invention that has a longer 2nd mode cutoff than the Volition and SMF-28 fibers and therefore is only single moded at the longer 1550 nm wavelength. This 125 micron glass diameter fiber demonstrated that it could provide 0.95 cm 90° bend losses of about 0.05 dB but on slightly tighter bends of 0.635 cm (1/4") 90°, the bend loss varied between 0.06 and 0.50 dB depending on the precise value of the 2nd mode cutoff. In the case of the lower loss of 0.06 dB the cutoff was 1500 nm, while in the case of the higher 0.5 dB loss, the cutoff was 1400 nm. This example demonstrates that for the tighter bend applications, the cutoff wavelength of these matched clad designs needs to be tightly controlled to maintain a loss of less than 0.2 dB.

Example 4

Figure 4:
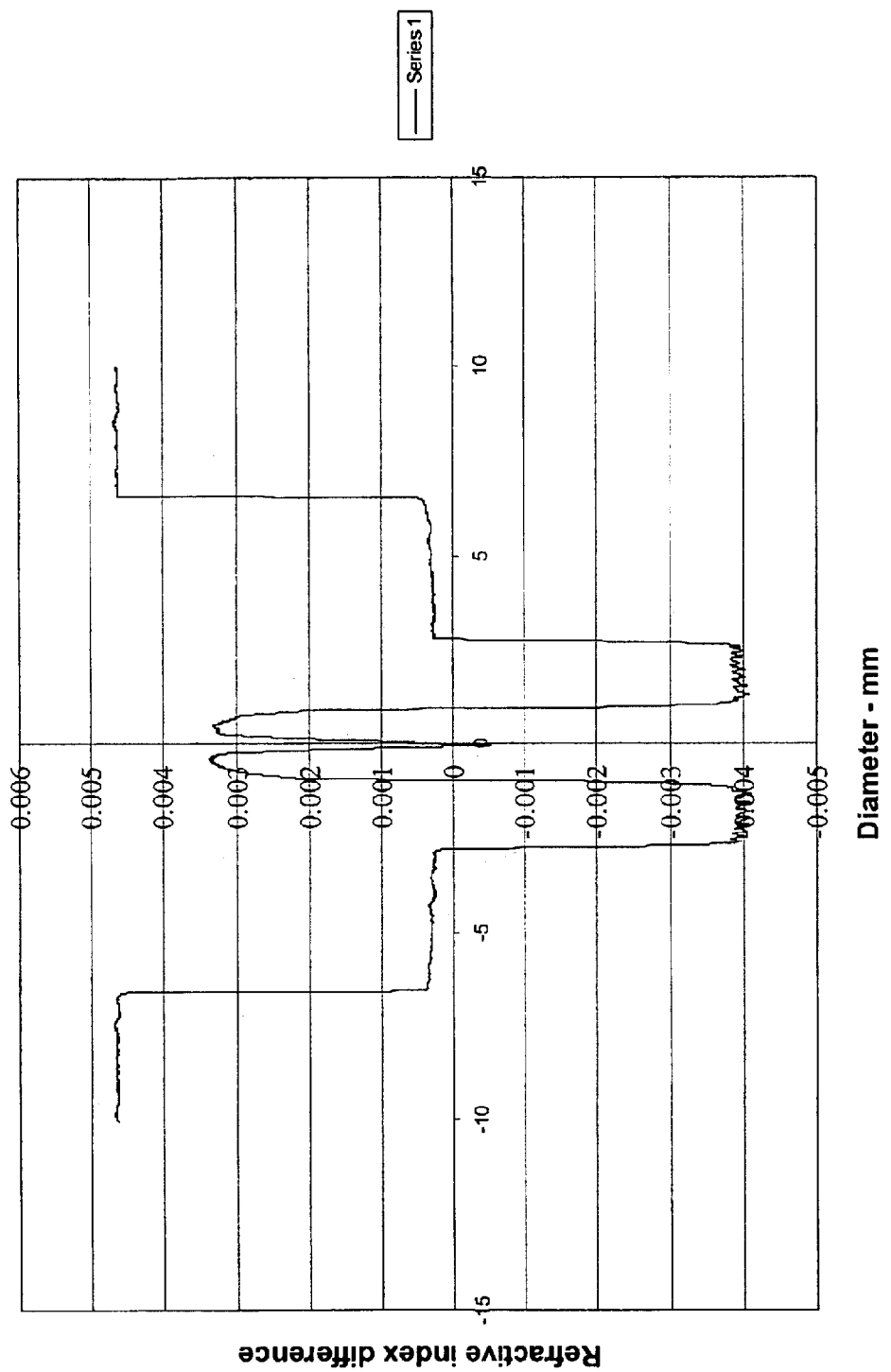
FIG. 4 is a graph depicting an actual refractive index profile along the diameter of another embodiment of a preform of an optical fiber in accordance with the present invention.

An exemplary depressed well design in accordance with the present invention was drawn to a 98 micron glass diameter. FIG. 4 illustrates the index profile for the resulting fiber. The fiber had a permanent hard polymer coating of 125 microns outer diameter (core/clad concentricity error of about 1.0 microns) and two strippable coatings to give a total diameter of 250 microns. Typical materials used for the inner strippable coating layer include silicone or acrylate materials such as Desolite 3471-3-152A, Desolite 3471-3-14, or Shin-Etsu OF-206. A typical material for use as the outer strippable coating includes acrylate or urethane-acrylate optical fiber coating materials such as Desolite 3471-2-136.

The fiber had the following characteristics:
a.) clad/core diameter ratio is 2.4
b.) $+\Delta$ of 0.0016
c.) $-\Delta$ of −0.0029
d.) $\Delta_{Tot}$ of 0.0045

The fiber exhibited the following characteristics:

| | |
|---|---|
| Second mode cutoff | 1220 nm |
| MFD at 1300 nm | 9.1 microns |
| MFD at 1550 nm | 10.3 microns |
| 0.635 cm 90° bend loss at 1550 nm | 0.08 dB |
| 0.635 cm 90° bend loss at 1600 nm | 0.15 dB |

This fiber demonstrated all the desired characteristics needed for the dual-band, tight bend applications. Dual-band is defined herein as wavelengths between 1300 and 1620 nm. For the purposes of this discussion, tight bend is defined as a 90 degree bend with a one-quarter inch (0.635 cm) radius.

The waveguide specifications were found to be interdependent, so there is a range of acceptable depths, widths, core and inner clad indices that allow an acceptable design for dual wavelength operation. In one set of embodiments, the depressed-well clad to core diameter ratio ranges from about 2.4 to 3.0, $+\Delta$ is in the range of 0.0014 to 0.0021 and $-\Delta$ is in the range of about −0.0021 to −0.0034. However, $\Delta_{Tot}$ ranges from about 0.0043 to 0.0049.

In one particular embodiment, the depressed-well clad to core diameter ratio is about 2.7, the $+\Delta$ is about 0.0019, the $-\Delta$ is about 0.0028 and the $\Delta_{Tot}$ is about 0.0047.

In yet another particular embodiment, the $+\Delta$ was 0.0014, the $-\Delta$ was 0.0033 and the $\Delta_{Tot}$ was again 0.0047 while the fiber had a depressed clad diameter to core diameter ratio of 2.4.

Those skilled in the art of optical waveguide manufacturing may readily ascertain a variety of chemical compositions that achieve the index profile disclosed in the present invention. Compositions used to fabricate modified chemical vapor deposition preforms in accordance with the present invention included a phosphorus fluorosilicate depressed-well inner cladding and a germanium silicate core. In the embodiment illustrated in FIG. 2, the equivalent step index of the core was about 0.0027 above silica and the depressed well was about 0.0040 below silica. Other designs included the use of phosphorus in the core to soften the glass for easier collapse.

In alternative embodiments, the core may include various index increasing dopant oxides such as phosphorus, germanium, aluminum, or lanthanum or combinations thereof. Similarly, the depressed cladding could be obtained by using fluorine and/or boron or combinations of these along with index enhancers such as the compositions used for the core. Such multi-component glasses may result in higher losses, but may be useful in obtaining other desirable fiber properties such as photosensitivity (for writing Bragg gratings) or a shifted dispersion characteristic.

An outer cladding that substantially matches the index of silica may be added with no change in overall performance. Other possibilities include a partially depressed outer cladding that could result in "softening" the fundamental cutoff versus wavelength characteristic.

An optical fiber in accordance with the present invention has the ability to tolerate tight bends (e.g., 0.25" or 0.635 cm radius) without resulting in undue mechanical stress, bend induced optical loss, or mechanical splice loss when connected to standard, high MFD fibers such as Corning's SMF-28. An optimized design is capable of providing this performance at both of the common telecommunication operating wavelength windows of 1300 and 1550 nm. Special fiber constructions include smaller glass diameters that permit tighter bends without overstressing the fiber mechanically and can be combined with 3M's special precision, permanent coating technology (so-called "GGP" fiber) to build the glass diameter up from 80–100 microns to 125 microns. This permits the fibers to be connected using commonly available mechanical connectors designed for 125 micron glass diameter fibers.

The fiber design of the present invention provides good modal confinement over a broad spectral range permitting one fiber to operate from 1300 to 1550 nm with minimal bend induced losses and still be mode matched to SMF-28 at both telecom transmission wavelengths, resulting in low loss mechanical interconnection. The special depressed-well design is clearly more bend tolerant than the matched clad design and offers an advancement in the state-of-the-art for mode matching to standard fibers, and would be useful for many applications including so-called "fiber-on-the-board". The term "fiber-on-the-board" refers to optical fibers routed on electronic circuit boards and backplanes, as disclosed in commonly-assigned U.S. Pat. Nos. 5,902,435 and 6,390,690.

Combining the dual wavelength window property of the glass design with the "permanent", precisely applied primary coating technology results in a fiber that can be used for both fiber-on-the-board and 1300–1550 nm applications (such as the VF-45™ patchcord connector where a 0.8" (2.03 cm) diameter bend is required). Another possible application for the present invention is fiber-to-the-home, where the benefits of simplified mechanical splicing and interconnection would be valuable.

Those skilled in the art will appreciate that the present invention may be used in a variety of optical designs and that fibers in accordance with the present invention may be used in a variety of optical devices. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. An optical waveguide comprising:
   a) a core having a refractive index $n_{co}$ and a radius $r_{co}$;
   b) an inner cladding laterally surrounding the core, the inner cladding having a refractive index $n_{ic}$ and an outer radius of $r_{ic}$;
   c) an outer cladding laterally surrounding the inner cladding, the outer cladding having a refractive index $n_{oc}$;
   d) wherein the core, inner cladding and outer cladding have a narrow depressed well configuration, wherein $n_{co} > n_{oc} > n_{ic}$, with
   e) the range of the ratio of the inner, depressed-well clad radius, $r_{ic}$, to core radius, $r_{co}$, varying from about 2.4 to 3.0;
   f) a $+\Delta$ of about 0.0014 to 0.0021;
   g) a $-\Delta$ of about $-0.0021$ to $-0.0034$; and
   h) a $\Delta_{Tot}$ of about 0.0043 to 0.0049, wherein the waveguide operates in two wavelength bands, wherein a first wavelength band is at about 1300 nm.

2. The optical waveguide of claim 1, wherein:
   a) the depressed-well clad to core diameter ratio is about 2.7;
   b) the $+\Delta$ is about 0.0019;
   c) the $-\Delta$ is about $-0.0028$; and
   d) the $\Delta_{Tot}$ is about 0.0047.

3. The optical waveguide of claim 1, wherein the optical waveguide is an optical fiber.

4. The optical waveguide of claim 1, wherein the optical waveguide is a single-mode optical fiber, and wherein a second wavelength band is at about 1550 nm.

5. The optical waveguide of claim 1, wherein the core has a diameter of about 10–12 micrometers.

6. The optical waveguide of claim 1, having an operating wavelength range between about 1300 to 1550 nm and a second mode cutoff wavelength of less than 1300 nm.

7. The optical waveguide of claim 1, having an operational mode field diameter between about 8.8 to 9.6 microns when measured at 1300 nm.

8. The optical waveguide of claim 1, having an operational mode field diameter between about 9.6 to 11.2 microns when measured at 1550 nm.

9. The optical waveguide of claim 1, having bend losses less than or equal to 0.05 dB when measured on a 0.635 cm 90 degree bend at 1300 nm and having bend losses less than or equal to 0.2 dB when measured on a 0.635 cm-90 degree bend at 1550 nm.

10. The optical waveguide of claim 1 having bend losses less than or equal to 0.2 dB when measured on a 0.635 cm 90 degree bend at 1550 nm.

11. The optical waveguide of claim 1 having bend losses less than or equal to 0.3 dB when measured on a 0.635 cm 90 degree bend at 1600 nm.

12. The optical waveguide of claim 1, wherein the waveguide has a glass core and claddings, the waveguide further comprising a hard polymer permanently bonded to the outside surface of the glass waveguide.

13. The optical waveguide of claim 12, wherein the hard polymer comprises a material having a Shore D hardness of at least 55.

14. The optical waveguide of claim 13, wherein the hard polymer comprises a material having a Young's Modulus of from 50 kg/mm$^2$ to 250 kg/mm$^2$ at room temperature.

15. The optical waveguide of claim 1, further comprising a soft polymer material coating the hard polymer, wherein the soft polymer materials comprises coatings selected from the group of Desolite 3471-3-14, Desolite 3471-1-152A, and Shin-Etsu OF-206.

16. The optical waveguide of claim 1, wherein the inner cladding comprises one or more of the following fluorosilicate, borosilicate, phosphorus fluorosilicate, phosphorus borosilicate, germanium fluorosilicate or germanium borosilicate composition.

17. An optical device including the optical waveguide of claim 1.

* * * * *